United States Patent
Hochwald

(10) Patent No.: US 8,929,828 B2
(45) Date of Patent: Jan. 6, 2015

(54) METHOD OF CODING USING MULTIPLE TRANSMIT CHAINS FOR REDUCED EXPOSURE TO ELECTROMAGNETIC RADIATION

(71) Applicant: Bertrand Martyn Hochwald, South Bend, IN (US)

(72) Inventor: Bertrand Martyn Hochwald, South Bend, IN (US)

(73) Assignee: Bertrand M. Hochwald, South Bend, IN (US)

( * ) Notice: Subject to any disclaimer, the term of this patent is extended or adjusted under 35 U.S.C. 154(b) by 0 days.

(21) Appl. No.: 14/173,849

(22) Filed: Feb. 6, 2014

(65) Prior Publication Data

US 2014/0153661 A1 Jun. 5, 2014

Related U.S. Application Data

(63) Continuation-in-part of application No. 13/506,250, filed on Apr. 6, 2012, now Pat. No. 8,818,294.

(60) Provisional application No. 61/850,114, filed on Feb. 8, 2013.

(51) Int. Cl.
*H04B 17/00* (2006.01)
*H04B 7/04* (2006.01)
*H04B 7/06* (2006.01)

(52) U.S. Cl.
CPC ............ *H04B 7/0465* (2013.01); *H04B 7/0617* (2013.01)
USPC ......................... 455/63.1; 455/67.11; 375/296

(58) Field of Classification Search
USPC .......... 455/501, 515, 522, 63.1, 67.11, 67.13, 455/69, 115.1, 127.1, 226.1; 375/260, 267, 375/295, 296
See application file for complete search history.

(56) References Cited

U.S. PATENT DOCUMENTS

| | | | |
|---|---|---|---|
| 2009/0143008 A1* | 6/2009 | Hottinen et al. | 455/11.1 |
| 2013/0090141 A1* | 4/2013 | Hottinen | 455/501 |
| 2014/0064401 A1* | 3/2014 | Wu et al. | 375/267 |
| 2014/0112403 A1* | 4/2014 | Falconetti et al. | 375/260 |

* cited by examiner

*Primary Examiner* — Thanh Le

(57) ABSTRACT

Embodiments of methods and apparatuses for transmission from an electromagnetic signal transmitting device utilizing a plurality of transmit chains based on a code that reduces exposure to electromagnetic radiation. One method is utilizing a plurality of chains, adjusting at least one of a phase or an amplitude of at least one of the transmit chains based on a code, wherein the codebook of code words is generated using at least one parameter that characterizes the electromagnetic radiation intensity, and wherein the number of code words satisfies a criterion for quality of reception at an intended receiver, and wherein the code words are selected, during operation of the transmitting device, in response to data that are to be transmitted.

21 Claims, 3 Drawing Sheets

| Codeword | 0 | 1 | 2 | 3 | 4 | 5 | 6 | 7 |
|---|---|---|---|---|---|---|---|---|
| Bit assignment | 000 | 001 | 110 | 111 | 101 | 110 | 010 | 011 |
| $s_1$ | 1 | $j$ | $-j$ | $-1$ | 1 | $j$ | $-j$ | $-1$ |
| $s_2$ | $e^{j\pi/3}$ | $je^{j\pi/3}$ | $-je^{j\pi/3}$ | $-e^{j\pi/3}$ | $e^{-j\pi/3}$ | $je^{-j\pi/3}$ | $-je^{-j\pi/3}$ | $-e^{j\pi/3}$ |

FIGURE 2

METHOD OF CODING USING MULTIPLE TRANSMIT CHAINS FOR REDUCED EXPOSURE TO ELECTROMAGNETIC RADIATION

RELATED APPLICATIONS

This patent application claims the priority of provisional patent application No. 61/850,114, filed Feb. 8, 2013, and is a continuation-in-part of application Ser. No. 13/506,250, filed Apr. 6, 2012.

GOVERNMENT LICENSE RIGHTS

This invention was made with government support under Grant No. CCF1141868 awarded by the National Science Foundation. The government has certain rights in this invention.

FIELD OF THE DESCRIBED EMBODIMENTS

The described embodiments relate generally to wireless transmission from a device with a plurality of transmit chains using a code to reduce exposure to electromagnetic radiation. More specifically, the described embodiments relate to methods for meeting exposure requirements using a code whose codebook is generated using at least one parameter that characterizes the electromagnetic radiation intensity of the device, and wherein the number of code words satisfies a criterion for quality of reception at an intended receiver.

BACKGROUND

Many portable wireless transmitting devices are used today in close proximity to the body, and are generally designed to meet electromagnetic radiation requirements set forth by the Federal Communications Commission (FCC) in the United States, and other similar government regulatory bodies abroad. Portable devices are getting smaller and more powerful, and are being equipped with multiple radios, many of them operating simultaneously, some of them transmitting simultaneously. Each transmitting radio exposes the user to some level of electromagnetic radiation. The acceptable radiation levels have not increased as the device power has increased. As a result, there is a need to design methods of transmission that control and reduce user exposure to electromagnetic radiation.

For example, cellular phones, especially so-called "smartphones", are generally equipped with transmitters that operate in the 3G bands, including 800 MHz and 1900 MHz bands, the 4G bands, which can range from 700 MHz to 2700 MHz, and the WiFi band (2401-2483 MHz). These transmitters may run concurrently, depending on the mode of operation of the device.

More recently, there has been interest in millimeter-wave frequencies for mobile and portable communications. With millimeter waves, exposure to electromagnetic radiation will also be a concern, especially for devices that are held near the human body.

In testing a device for radiation levels, the FCC requires the transmitting device to be put into its mode of operation that yields the greatest exposure level. With multiple radios transmitting concurrently, the radiation is potentially additive. Hence, every added radio in a device places an additional compliance burden on each radio separately to meet radiation thresholds. The lower the radiation level of a given radio, the more likely the device as a whole will meet regulatory compliance. Generally, compliance is desired without having to sacrifice the output power of the individual radios.

SUMMARY OF THE DESCRIBED EMBODIMENTS

An embodiment includes a method of transmission utilizing a plurality of transmit chains from an electromagnetic signal transmitting device. The method includes adjusting at least one of a phase or an amplitude of at least one of the transmit chains of the device based on a code, wherein the codebook of code words is generated using at least one parameter that characterizes the near-field electromagnetic radiation intensity of the device. The number of code words satisfies a criterion for quality of reception at an intended receiver. In an embodiment, the code maintains the electromagnetic radiation below a threshold considered safe or acceptable. In an embodiment, the electromagnetic radiation threshold is determined by the specific absorption rate (SAR). In an embodiment, the plurality of transmit chains is used to transmit a plurality of streams of data. In an embodiment, the at least one parameter that characterizes the electromagnetic radiation intensity includes at least one predetermined phase angle between the transmit chains. In an embodiment, the at least one parameter is stored in internal memory of the transmitting device. In an embodiment, the quality of reception includes data-rate to the intended receiver. In an embodiment, the quality of reception includes minimum acceptable signal-to-noise ratio at the intended receiver. In an embodiment, the at least one parameter is known to the intended receiver.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 is an example of a codebook for reducing exposure to electromagnetic radiation, wherein the code uses two transmit chains.

DETAILED DESCRIPTION OF INVENTION

Figures 1A, 1B:
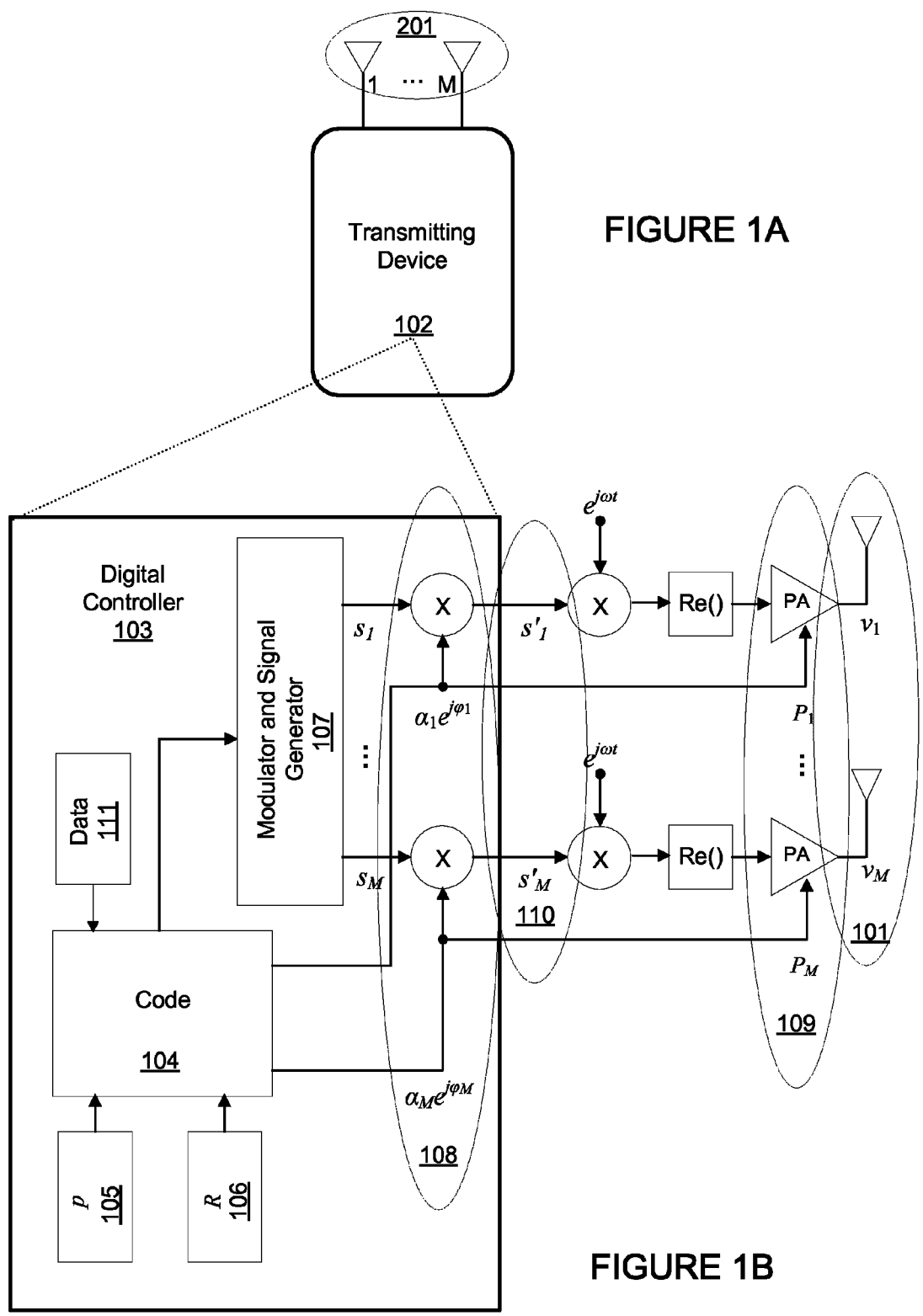
FIGS. 1A and 1B show an example of a transmitter using multiple transmit chains to adjust at least one of a phase or an amplitude of at least one of the transmit chains based on a code whose codebook incorporates at least one parameter that characterizes the near-field electromagnetic radiation intensity, and where the number of code words satisfies a criterion of quality of reception at a far-field intended receiver.

The described embodiments provide methods for transmission from a electromagnetic signal transmitting device with a plurality of transmit chains, wherein the transmitted signals adjust at least one of a phase or an amplitude of at least one of the transmit chains based on a code. The code comprises a codebook whose code words are generated using at least one parameter of the device that characterizes its electromagnetic radiation intensity as it influences or is absorbed by a person that is holding or near the device. One of the outcomes of an embodiment is to meet the potentially competing requirements of low electromagnetic radiation intensity and good quality of reception. The embodiments are operable, for example, in portable devices operated near the human body where electromagnetic radiation intensity thresholds are commonly enforced, often in the near-field (commonly defined to be within ten wavelengths of the carrier frequency) to the transmitting device. The requirement of low electromagnetic radiation intensity generally imposes a constraint on the maximum output transmission power (or amplitude) of the device.

Conversely, the requirement of good reception at an intended receiver generally imposes a constraint on the minimum power received at an intended receiver. The intended receiver is often in the far-field of the transmitting device, where far-field may indicate ten or more wavelengths away. The electromagnetic signal strength as experienced by an intended receiver can affect reception quality, with higher strength often equating to better quality of reception. Nevertheless, for the purposes of the described embodiments, electromagnetic radiation intensity as described herein generally refers to the intensity as experienced by a person holding or near the device. Since there generally are limits imposed on the radiation intensity experienced by a person near a transmitting device, a device design must be cognizant of these limits in order to comply with regulatory requirements. One application for the described embodiments is for helping a device to meet these regulatory requirements.

The FCC requires for devices that emit electromagnetic radiation to adhere to electromagnetic radiation intensity limits, especially as applies to human exposure. These limits are often based on maximum permissible exposure (MPE), expressed in power per-unit area, and specific-absorption rate (SAR), expressed in power per-unit mass. A SAR measurement requires specialized mannequins, electrolytes, and robotically-controlled probes, with the device operating at full power while the probe searches for worst-case electromagnetic field measurements. For the purposes of this invention, the term "electromagnetic radiation intensity" includes SAR and MPE.

The actual radiation limits in force are a function of the device usage; occupational usage with controlled exposure is allowed higher limits (often a factor of five) than the general population, where exposure is uncontrolled. Tables 1 and 2 indicate some of the limits currently in force for the general population.

TABLE 1

MPE thresholds enforced for general population (mW/cm$^2$)

| Frequency Range ($f$ in MHz) | Power Density (mW/cm$^2$) | Averaging Time (min) |
| --- | --- | --- |
| 300-1500 | $f$/1500 | 30 |
| 1500-100,000 | 1.0 | 30 |

TABLE 2

SAR thresholds enforced for general population (W/kg)

| Whole-Body | Partial-Body | Hands, Wrists, Feet, Ankles |
| --- | --- | --- |
| 0.08 | 1.6 | 4.0 |

SAR is a measure of absorption of electromagnetic radiation by human body tissue, and subsequent conversion to heat. The radiation thresholds in Table 2 represent the maximum levels that the body can safely dissipate. Radiation limits are most stringent for transmission devices that are meant to be used within 20 cm of the body. In particular, cordless and cellular phones are often held close to the head for listening and speaking Generally, the partial-body value of SAR=1.6 W/kg threshold applies in these cases.

Multiple Transmit Chains

Multiple transmit chains, such as those found in portable devices, are traditionally used to allow multiple radios to operate simultaneously. Examples include simultaneous operation of a cellular radio in the 800 MHz band and a wireless local-area network radio in the 2400 MHz band. The radiation limitations in force such as SAR threshold values apply independently of the number of transmit chains. Testing methodologies have been developed when there is more than one chain. Generally, the SAR thresholds must be met during normal operation of the device, using the transmit chains that are normally active, and at their maximum transmit power.

It is generally understood to those practiced in the art that a wireless transmit chain includes a baseband signal generator, phase and amplitude adjuster, modulator for radio-frequency generation, amplifier, and antenna. However, when a plurality of transmit chains are used in a single device, one or more baseband signal generator, phase or amplitude adjuster, modulator, or amplifier may be shared amongst one or more chains. A characteristic feature of a plurality of transmit chains is that a plurality of transmit signals is being transmitted by the device.

It is generally understood that a device that contains a plurality of transmit chains may also contain multiple receive chains, thereby making the device a transceiver (able to transmit and receive a plurality of signals, possibly simultaneously). Since radiation requirements generally do not apply to the receiving components of a device, the embodiments described herein generally omit the details concerning the receive chains that may accompany the transmit chains.

This invention concerns the use of multiple transmit chains operating in the same band to provide low electromagnetic radiation intensity within the band, while maintaining a criterion for quality of reception at an intended receiver. The invention utilizes the fact that many measures of radiation intensity such as SAR and MPE are power density measurements (Watts per kilogram or Watts per square-meter), and therefore measures the power concentrated in a given volume or area. Hence, a given amount of power transmitted from a single transmit chain (occupying a small volume) is likely to have a larger SAR or MPE than the same amount of power transmitted using a plurality of chains (occupying a larger volume) that are operating simultaneously. Factors that affect this phenomenon include the power assigned to the chains, the relative carrier phase relationships of the chains, types of antennas, and the physical separation of the chains. Other physical properties of the device, including its size and material from which it is constructed can affect SAR and MPE.

A wireless transmission device in normal course of operation generally wishes to communicate with an intended receiver. Hence, the multiple transmit chains, while maintaining low electromagnetic radiation, also need to operate in a manner consistent with meeting reception quality at the intended receiver. As an embodiment of the invention, one method to attain this outcome is to employ a controller that modulates at least one of the phases or the amplitudes of the transmit chains according to a code. The codebook contains code words generated using at least one parameter that characterizes electromagnetic radiation intensity of the device.

In the case where the radiation intensity of interest is SAR, the characterization may be near-field to the device, where near-field often refers to a region within ten wavelengths of the device, where wavelength is with respect to the transmission frequency ω. This is especially true with SAR, where measurement distances of a few millimeters are common. In the case where the radiation intensity is MPE, the characterization does not necessarily have to be near-field.

When there are multiple transmit chains, the electromagnetic radiation intensity as experienced by person holding or near the device depends, among other things, on the device design, its antennas, and the relative power and phase of the transmitters. The electromagnetic radiation intensity as a function of the vector of transmitted signals v is denoted S(v). Often, a maximum threshold is imposed on the radiation intensity $$S(v) \leq \tau.$$

In the case where electromagnetic radiation is SAR, a threshold such as τ=1.6 W/kg for partial-body given in Table 2 could apply. The threshold used in practice depends on the intended user of the device (such as occupational versus general public) and intended use of the device, country of operation, and acceptable margin of safety. The threshold is denoted τ, with the understanding that this parameter is to be set by the device manufacturer and regulations in effect at the time of production. With such a threshold in place, it is important that S(v) never exceed this threshold. In one of the embodiments described herein, a code that describes the transmitted signals is used to ensure that the threshold is not exceeded.

Besides obeying radiation intensity thresholds, the transmitter should also transmit signals that obey a given criterion for quality of reception at an intended receiver. An example of such a criterion is a rate R, generally expressed in bits-per-channel-use or bits-per-transmission, that describes how many bits are contained in each transmission. Generally, higher R is considered beneficial since higher transmission rates are generally welcome. The rate R is often used to determine the number of code words. Examples of other criteria for quality of reception include, but are not limited to, signal-to-noise ratio (SNR). Note that SNR is often governed by "far-field" phenomena where the distance between the transmit chain radiating element(s) of the device and the intended receiver is usually more than ten wavelengths of the transmission frequency ω. Hence, many of the classical theories of far-field propagation and channel modeling apply to the modeling of SNR.

FIGS. 1A and 1B show an embodiment of a transmitter architecture that uses both an electromagnetic radiation parameter p and a reception quality criterion R to generate the code and number of code words. The figure displays M transmit chains connected to corresponding antennas (101) in a device (102) that uses a controller (103) to modulate and generate the transmission signals (107) using a code (104). The code (104) utilizes one or more parameters p (105) that characterize the electromagnetic radiation, and the criterion for quality of reception R (106). The data to be transmitted (111) is used during operation of the transmitting device to choose code words, which are then fed to the modulator (107) and the amplitudes α and phases φ (108) and the power P (109) to influence the transmission.

The vector of baseband signals $s=[s_1 \ldots s_M]^T$ is generated by the modulator (107) based on the mode of transmission, and is multiplied by $\alpha \odot e^{j\phi}$ in (108), where $\alpha=[\alpha_1 \ldots \alpha_M]^T$ and $\phi=[\phi_1 \ldots \phi_M]^T$, to create the vector s' (110), which is then modulated to transmission carrier frequency ω, and amplified in (109) to create the transmitted vector v. The symbol "⊙" refers to element-by-element multiplication. Therefore, $$v=Re\{\sqrt{P} \odot s \odot \alpha \odot e^{j(\omega t+\phi)}\},$$

where $P=[P_1 \ldots P_M]^T$ is a vector of amplifier powers. The code therefore utilizes p to directly influence the transmitted signal v with a goal of reducing human exposure to electromagnetic radiation. Since the amplitudes α and the phases φ of the transmit chains typically influence the electromagnetic radiation intensity and exposure, the parameter(s) p may include certain α and φ that lead to high or low levels of exposure. Knowing p, a code may thus be designed to avoid particular amplitudes and phases that lead to high levels of exposure.

Example with Two Transmit Chains

When there are two transmit chains, there are two phases, $\phi_1$ and $\phi_2$, corresponding to the transmit phases of the two chains. Generally, any dependence of the electromagnetic radiation intensity would be a function of the phase difference $\phi_2-\phi_1$. Certain phase differences would lead to high intensity and certain differences lead to low intensity. Hence the parameters p (105) in FIG. 1B could contain particular $\phi_2-\phi_1$ values that lead to certain intensity values. In one embodiment, p corresponds to peak intensity. In another embodiment, p corresponds to minimum intensity. The code words in the code (104) would then be created to avoid phase differences with high intensity, and emphasize phase differences with low intensity.

The transmitter tries to communicate with an intended receiver and satisfy a criterion of reception. In the case where the method of transmission uses a single stream of data, such as beam forming, the two chains may transmit the same data symbol, but differing by a phase $\phi_2-\phi_1$ that steers the energy in a desirable direction. In this case, a natural reception quality is SNR, which is directly proportional to the received power. If we assume that $P_1=P_2=P$ (109), then a criterion for quality of reception (106) could be $$R=|\alpha_1 e^{j\phi_1}h_1+\alpha_2 e^{j\phi_2}h_2|^2 P$$

where $h_1$ and $h_2$ are the respective channels from the two transmit chains to an antenna on the intended receiver. Assuming the digital controller (103) knows $h_1$ and $h_2$, it may adjust $\alpha_1, \alpha_2, \phi_1$, and $\phi_2$ to obtain good quality of reception while still maintaining the radiation intensity at an acceptable level.

In one embodiment, using knowledge of p, the code that adjusts at least one of a phase or an amplitude of at least one of the transmit chains is designed to balance the competing requirements of good quality of reception at the intended receiver (high R, such as obtained by increasing P or allowing all $\phi_2-\phi_1$) versus low electromagnetic radiation intensity (low S(v), such as can be obtained by reducing P or restricting $\phi_2-\phi_1$ to only those with low radiation intensity).

Figure 3:
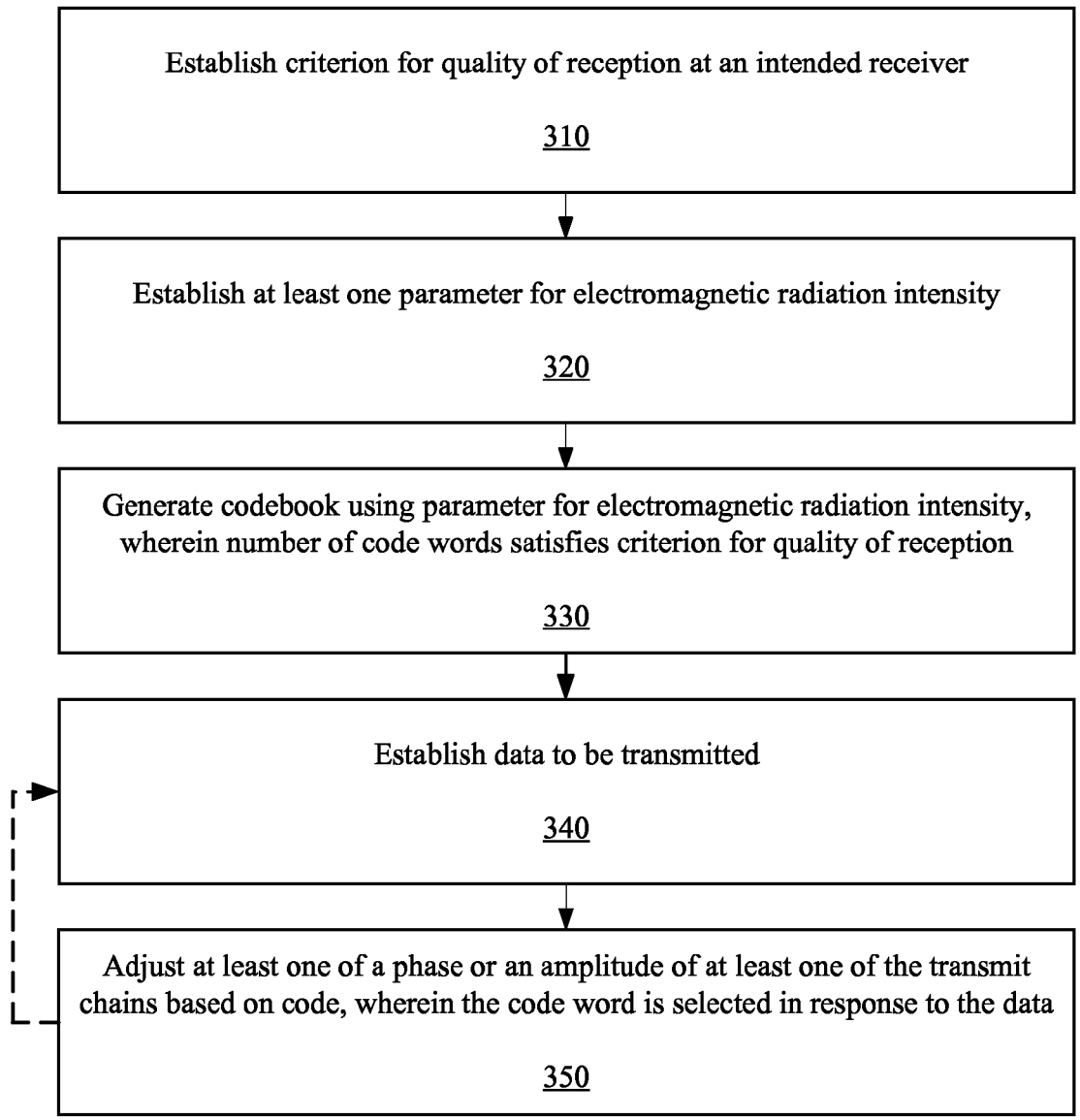
FIG. 3 is a flow chart that includes steps of transmitting from multiple chains based on a code for reducing exposure to electromagnetic radiation, according to an embodiment.

An example of such a code for two transmit chains on a particular device is shown in FIG. 3, wherein a code book of eight code words (labeled "0" through "7") is presented. Each code word indicates what is to be transmitted on the first transmit chain (labeled "$s_1$") and the second transmit chain (labeled "$s_2$") simultaneously, in response to the data to be transmitted, three bits at a time (labeled "Bit assignment"). As an example of operation, if the bits to be transmitted are "000", then $s_1=1$ and $s_2=e^{j\pi/3}$, indicating the relative phase of the carrier signal between the two transmit chains should be π/3 radians, and the transmit powers on both chains are equal.

In this example with this particular device, it was determined during testing and prior to operation of the device, that low radiation intensity could be obtained with relative phase +π/3 or −π/3. This information can be encapsulated in the parameters characterizing the electromagnetic radiation used by the device to generate the code of FIG. 3. The parameters in this case is the vector p=[+π/3 −π/3]. This parameter vector is used by the code to generate the codebook shown in FIG. 3. The criterion for quality of reception at an intended receiver is R=3 bits-per-channel use, thus leading to the generation of $2^3=8$ code words.

This example is not intended to be limiting, in that other devices may yield low intensity for different values of p. Hence, the code generated and used by another device could differ because of the different parameter vector p.

In order for a receiver to decode the transmission from the transmitting device, the receiver should have the codebook of code words available. Absent the codebook, the receiver should have p available so that it may generate its own codebook of code words in a manner similar to the transmit device. One way for the receiver to learn p is to have the receiver be told p by the transmit device during a handshake negotiation, prior to use of the code during operation. Alternatively, the receiver can itself have a database of stored p values for various devices known in advance of operation of the device. The transmit device then merely has to identify itself and the receiver will know which codebook is being used.

Transmitting with M≥2 Transmit Chains

The example provided for two transmit chains can be generalized to more than two in a straightforward way. In one embodiment, all the M elements of $\alpha$ and $\phi$ can be adjusted based on the code. In other embodiments, only at least one of a phase or an amplitude of the M phases and amplitudes are adjusted based on a code. In other embodiments, the vector P is also adjusted as a proxy for amplitude, with a possibly different time-scale than $\alpha$ and $\phi$, which may be done on a symbol-by-symbol basis.

FIG. 3 is a flow chart that includes steps of transmitting from a plurality of transmit chains, according to an embodiment. A first step (310) includes establishing a criterion of reception at an intended receiver. A second step (320) includes establishing at least one parameter for electromagnetic radiation intensity. A third step (330) includes utilizing the threshold and quality of reception criterion to generate a codebook, wherein the code cord words are generated using the at least one parameter for electromagnetic radiation. The number of code words in (330) satisfies the criterion for quality of reception. Steps (310), (320) and (330) can be thought of as part of off-line design, testing, or set-up, prior to use of the device in operation and transmission of data.

A fourth step (340) includes establishing data to be transmitted, and the fifth step (350) includes adjusting at least one of a phase or an amplitude of at least one of the transmit chains based on the code, wherein the code word is selected in response to the data. Steps (340) and (350) can be thought of as part of operation of the device, during transmission of data to an intended receiver. The cycle of establishing data and transmitting code words is repeated until the data is exhausted.

For an embodiment, the plurality of transmit chains are used to transmit a plurality of streams of data to the intended receiver. For an embodiment, the electromagnetic radiation intensity includes specific absorption rate (SAR). For another embodiment, the electromagnetic radiation intensity includes maximum permissible exposure (MPE). For an embodiment, the code maintains the electromagnetic radiation intensity below a threshold. For an embodiment, the plurality of transmit chains are used to beam form to the intended receiver.

For an embodiment, the at least one parameter includes at least one predetermined phase angle between the transmit chains, wherein the predetermined phase angle is with respect to the transmission carrier waveform. For an embodiment, the at least one predetermined phase angle corresponds to a predetermined electromagnetic radiation intensity.

For an embodiment, the reception quality includes data rate to the intended receiver. For an embodiment, the reception quality includes signal-to-noise ratio at the intended receiver.

For another embodiment, the electromagnetic radiation is near-field. For an embodiment, the near-field is within 10 transmission-frequency wavelengths of the transmit chains.

An embodiment includes a transmitter that utilizes a plurality of transmit chains, wherein a transmission signal of at least one transmit chain includes at least one of an adjustable phase or an adjustable amplitude, and a controller operative to adjust at least one of a phase or an amplitude of at least one of the transmit chains based on a code.

In an embodiment, the code words in the codebook are generated using at least one parameter that characterizes the electromagnetic radiation intensity. In an embodiment, the number of code words satisfies a criterion for quality of reception at an intended receiver. In an embodiment, the criterion of reception quality includes data rate to the intended receiver. In another embodiment, the criterion of reception quality includes SNR at the intended receiver.

Although specific embodiments have been described and illustrated, the embodiments are not to be limited to the specific forms or arrangements of parts so described and illustrated. The embodiments are limited only by the appended claims.

What is claimed:

1. A method of transmission from an electromagnetic signal transmitting device, comprising:
   utilizing a plurality of transmit chains of the electromagnetic transmitting device to transmit electromagnetic signals;
   adjusting at least one of a phase or an amplitude of at least one of the transmit chains based on a code, wherein:
      the codebook of code words is generated using at least one parameter that characterizes near-field electromagnetic radiation intensity of the electromagnetic signal transmitting device;
      the number of code words satisfies a criterion for quality of reception at an intended receiver;
      the code words are selected, during operation of the transmitting device, in response to data that are to be transmitted.

2. The method of claim 1, wherein the plurality of transmit chains are used to transmit a plurality of streams of data to the intended receiver.

3. The method of claim 1, wherein the electromagnetic radiation intensity includes specific absorption rate (SAR).

4. The method of claim 1, wherein the at least one parameter that characterizes the electromagnetic radiation intensity includes at least one predetermined phase angle between the transmit chains.

5. The method of claim 4, wherein the at least one predetermined phase angle is an angle corresponding to a predetermined electromagnetic radiation intensity.

6. The method of claim 1, wherein the near-field is within 10 transmission-frequency wavelengths of the device surface.

7. The method of claim 1, wherein the code maintains the electromagnetic radiation intensity below a threshold.

8. The method of claim 1, wherein the at least one parameter is stored in internal memory of the transmitting device.

9. The method of claim 1, wherein the at least one parameter is known to the intended receiver.

10. The method of claim 1, wherein the at least one parameter is determined offline during testing of the transmitting device, prior to usage of the transmitting device in operation.

11. The method of claim 1, wherein the criterion for quality of reception at an intended receiver is data rate.

12. A method of transmission from an electromagnetic signal transmitting device, comprising:
utilizing a plurality of transmit chains of the electromagnetic transmitting device to transmit electromagnetic signals;
adjusting at least one of a phase or an amplitude of at least one of the transmit chains based on a code, wherein:
the codebook of code words is generated using at least one parameter that characterizes the maximum permissible exposure (MPE) of the electromagnetic signal transmitting device;
the number of code words satisfies a criterion for quality of reception at an intended receiver;
the code words are selected, during operation of the transmitting device, in response to data that are to be transmitted.

13. The method of claim 12, wherein the plurality of transmit chains are used to beam form to the intended receiver.

14. A transmitter, comprising:
a plurality of transmit chains, wherein a transmission signal of at least one transmit chain includes at least one of an adjustable phase or an adjustable amplitude;
a controller operative to adjust at least one of a phase or an amplitude of at least one of the transmit chains according to a code, wherein:
the codebook of code words is generated using at least one parameter that characterizes electromagnetic radiation intensity of the electromagnetic signal transmitting device;
the number of code words satisfies a criterion for quality of reception at an intended receiver;
the code words are selected, during operation of the device, in response to data that are to be transmitted.

15. The transmitter of claim 14, wherein the plurality of transmit chains are used to beam form to the intended receiver.

16. The transmitter of claim 14, wherein the plurality of transmit chains are used to transmit a plurality of streams of data to the intended receiver.

17. The transmitter of claim 14, wherein the electromagnetic radiation intensity includes specific absorption rate (SAR).

18. The transmitter of claim 14, wherein the at least one parameter that characterizes the electromagnetic radiation intensity includes at least one predetermined phase angle between the transmit chains.

19. The transmitter of claim 14, wherein the electromagnetic radiation intensity includes maximum permissible exposure (MPE).

20. The transmitter of claim 14, wherein the code maintains the electromagnetic radiation intensity below a threshold.

21. The transmitter of claim 14, wherein the criterion of reception quality includes data rate to the intended receiver.

* * * * *